United States Patent [19]

Satomi et al.

[11] Patent Number: 5,278,666
[45] Date of Patent: Jan. 11, 1994

[54] FACSIMILE METHOD AND APPARATUS FOR PRINTING COPY DOCUMENTS AND FACSIMILE DOCUMENTS THAT ARE VISUALLY DISTINGUISHABLE

[75] Inventors: Mitsuo Satomi, Kyoto; Takahiro Ogawa, Uji, both of Japan

[73] Assignee: Murata Kikai Kabushiki Kaisha, Kyoto, Japan

[21] Appl. No.: 683,779

[22] Filed: Apr. 11, 1991

[30] Foreign Application Priority Data

Apr. 4, 1990 [JP] Japan .................................. 2-99055
Apr. 26, 1990 [JP] Japan ................................. 2-113078

[51] Int. Cl.⁵ .............................................. H04N 1/00
[52] U.S. Cl. ..................................... 358/443; 358/405
[58] Field of Search ............ 358/443, 449, 496, 498, 358/486, 401, 402, 406, 296, 400, 440; H04N 1/00, 1/04

[56] References Cited

U.S. PATENT DOCUMENTS

| | | | |
|---|---|---|---|
| 4,811,111 | 3/1989 | Kurokawa | 358/440 |
| 4,908,714 | 3/1990 | Iriyama et al. | 358/405 |
| 5,130,805 | 7/1992 | Rickima | 358/296 |

FOREIGN PATENT DOCUMENTS 59-216369 12/1984 Japan.

*Primary Examiner*—Stephen Brinich
*Attorney, Agent, or Firm*—Spensley Horn Jubas & Lubitz

[57] ABSTRACT

Facsimile recording method and apparatus which accurately discriminates a received document sheet. The end pattern printed when the reception mode is selected is different from the end pattern printed when the copy mode is selected, or a marking device for giving a mark indicating reception of data on a recording sheet is provided within a recording sheet transfer path.

4 Claims, 5 Drawing Sheets

FACSIMILE METHOD AND APPARATUS FOR PRINTING COPY DOCUMENTS AND FACSIMILE DOCUMENTS THAT ARE VISUALLY DISTINGUISHABLE

FIELD OF THE INVENTION

The present invention relates to a recording method and a recording apparatus in a facsimile apparatus and particularly to a recording method and an apparatus which accurately discriminates a received document sheet.

DESCRIPTION OF THE RELATED ART

A rolled paper is often used as the sheet for recording a received document in a facsimile apparatus. In a case where a received document is recorded directly on a rolled paper, the recorded sheet becomes longer and inconvenient for treatment when many pages of document are received or documents are received in i.e., many times (many calls are received). Therefore, a facsimile apparatus has been proposed, where a cutter is included and this cutter is operated to automatically separate the recording paper sheet by sheet each time when the recording of a sheet of document has been completed. However, a facsimile apparatus comprising a cutter requires high manufacturing cost and requires maintenance for damaged or dulled blades.

As an alternative to such a method, it has also been proposed in the Japanese Provisional Utility Model Application No. 36677/1980 to record the end line or end mark for each end of a recording of a sheet of document. According to this method, since the end line or end mark can be recorded by a recording apparatus, it is no longer necessary to provide a particular member such as a cutter, and when the recording is completed, the sheet may be separated at the recorded end line or end mark using a pair of scissors.

Here, the facsimile apparatus is capable of printing the data read by its reading device with its own recording device and is often provided with a copy mode operating as a copying function. Even in such copy mode, it is convenient to record the end line for each end of a single page copying. However, it sometimes occurs that a received document and a copied document cannot be discriminated accurately by only viewing the recorded sheet. In general, an operator is standing beside the facsimile apparatus for the purpose of performing the copying operation and therefore it is a rare case that a received document is erroneously considered as a copied document. But, an operator is not always standing beside the facsimile apparatus. Moreover, a journal is usually recorded with the received document and the copied document does have such recording. However, in a case where the received document is copied, such journal is also copied. Therefore, it is also impossible to discriminate the received document and the copied document depending on the presence of the recording of a journal.

As explained above, in a case where the facsimile apparatus is provided with a copying function, the recorded document is sometimes mingled with the copied document as the printed output.

In addition, an operation for accurately discriminating a recorded document of the facsimile apparatus which uses, as a recording sheet, ordinary paper cut in a predetermined size such as JIS, A4 or B4 will be explained hereunder.

In such a facsimile apparatus, the transmission end mark is printed on the document sheet transmitted in order to confirm whether transmission has been carried out successfully or not, but such marking is not carried out on the receiving side. In this case, when a thermosensitive paper is used as the recording sheet, it can easily be discriminated from the paper copying the received content (an ordinary paper is usually used).

However, in recent years, a facsimile apparatus which records the received content on an ordinary sheet in place of thermosensitive paper has been proposed. In such a facsimile apparatus, since ordinary paper is used for recording the received content and for copying the received content, it becomes impossible to discriminate between the recording paper and the copying paper. Therefore, for instance, when it is requested to transmit again by facsimile the received content, a copying paper having deteriorated printing quality is used in some cases as the transmission document. As a result, a problem rises, namely the printing quality of the received content on the recording paper is further deteriorated.

OBJECT AND SUMMARY OF THE INVENTION

With such background, the present invention has been proposed and it is therefore an object of the present invention to provide a facsimile apparatus which can accurately discriminate a received document sheet.

Moreover, it is also an object of the present invention to accurately discriminate the document sheets without confusion by giving end of line patterns for each page of the printed recording sheet to the received document sheet and the copied document sheet.

The present invention is characterized in that the end pattern recorded when a receiving mode is selected is different from the end pattern printed when a copying mode is selected in the facsimile recording method comprising facsimile signal receiving means, end pattern signal generating means for generating at least two kinds of end pattern signals, document reading means, recording means, selection means for selecting the receiving mode and copying mode and end pattern signal introducing means for introducing the signal to the recording device from the end pattern signal generating means, wherein the end pattern based on the signal sent from the end pattern signal generating means is recorded on the recording sheet based on the reception end signal for each page of document when the receiving mode is selected or on the read end of each page of document when the copying mode is selected.

In addition, in order to attain the object explained above, the present invention is characterized in that a marking means for giving a mark indicating successful reception to the recording sheet is provided in the recording sheet transfer path in the facsimile apparatus where an image focusing means for generating an image on the sheet for recording the received content is provided in the sheet transfer path.

According to the structure explained above, the sheet printing the received content can accurately be discriminated from the sheet copying such received content. Therefore, for example, in case it is requested to send again the received content by the facsimile apparatus, it can be avoided to use the copied sheet having deteriorated printing quality and thereby deterioration of printing quality by repeated reception can be suppressed.

BRIEF DESCRIPTION OF THE DRAWINGS

FIGS. 7a, 7b show embodiment of a stamp driving system, wherein FIG. 7a is a side elevation and FIG. 7b is a front elevation.

DETAILED DESCRIPTION OF THE PREFERRED EMBODIMENT

Figure 2:
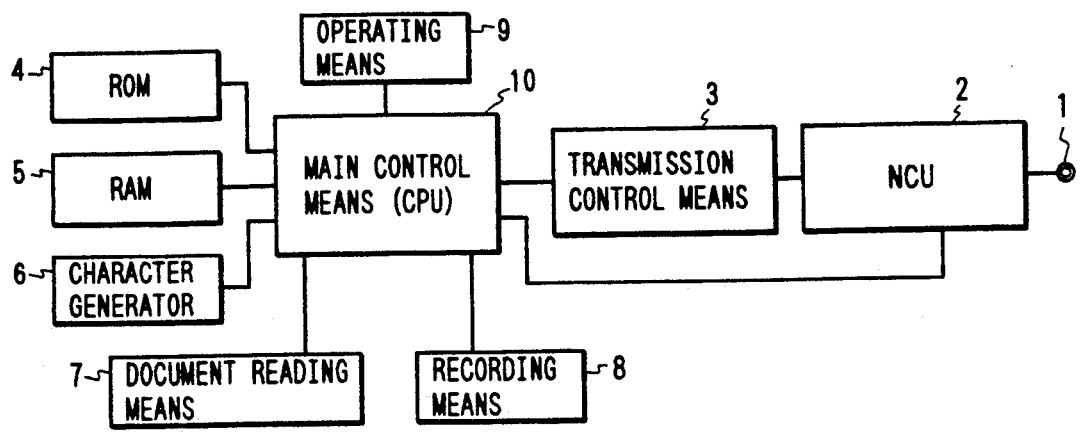
FIG. 2 is a schematic structural diagram of an example of a facsimile apparatus to be applied to the recording method of FIG. 1.

FIG. 2 is a schematic structural diagram of the facsimile apparatus for explaining an embodiment of the present invention. In this figure, the numeral 1 denotes line; 2, NCU; 3, transmission control means; 4, ROM for storing programs and fixed information; 5, RAM; 6, character generator; 7, document reading means; 8, recording means; 9, operating means; 10, main control means (CPU) for controlling these means.

The end pattern described above is stored in ROM 4 as a dot pattern. However, as will be explained later, since as the end pattern, the lines, characters, codes of various patterns or combination of these may be used, the end pattern may be stored in ROM 4, RAM 5 in accordance with these or may be generated by programs. In this embodiment, the copying mode is selected, at the time of switching the receiving mode or copying mode, by setting a document to the document reading means 7 and then depressing the communication/copy button of the operating means 9. When the communication/copy button is depressed after inputting the facsimile number, the facsimile transmission is carried out. In case the automatic reception mode or manual reception mode is selected as the reception mode at the operating means, when the facsimile signal is received, the reception mode starts in the case of automatic reception mode, upon termination of a facsimile call or after the information to send the facsimile signal is received, the reception mode starts by depressing the reception button at the operating means in the case of the manual reception mode and such facsimile signal is received after termination of a facsimile call.

As an example of printing the end pattern, a kind of line is changes such as the dotted line for facsimile reception or the chain line for copying operation. Moreover, it is also possible to change the thickness of the line or the number of lines. In addition, it is further possible to use lines, characters or symbols such as an adequate end line for reception or a string of characters or continuous strings of characters of "copy" for copying. An adequate pattern may be introduced as the printing position. Namely, the end part may be printed only near the vicinity of the side end part or across the entire width of the recording sheet (continuation of a plurality of characters or symbols) by feeding the paper up to the ending position of a page, or to the position after the adequate paper feeding from the ending position or to the predetermined dimensions of the recording sheet in size of A4, B4, etc.

In a case where the pattern elements are continued like a chain line or a dotted line, only the pattern of the minimum unit need be stored in ROM 4 and the printing of a line may be realized by repeating the required number of such patterns based on a program. It is also possible to insert a number of pages to a partial region by combining the line and symbol.

The end pattern may be printed depending on the control recovery (RTC) signal, for example, immediately after reception of such signal, or after feeding the recording sheet for an adequate amount or after feeding the recording sheet up to a predetermined position.

Figure 1:
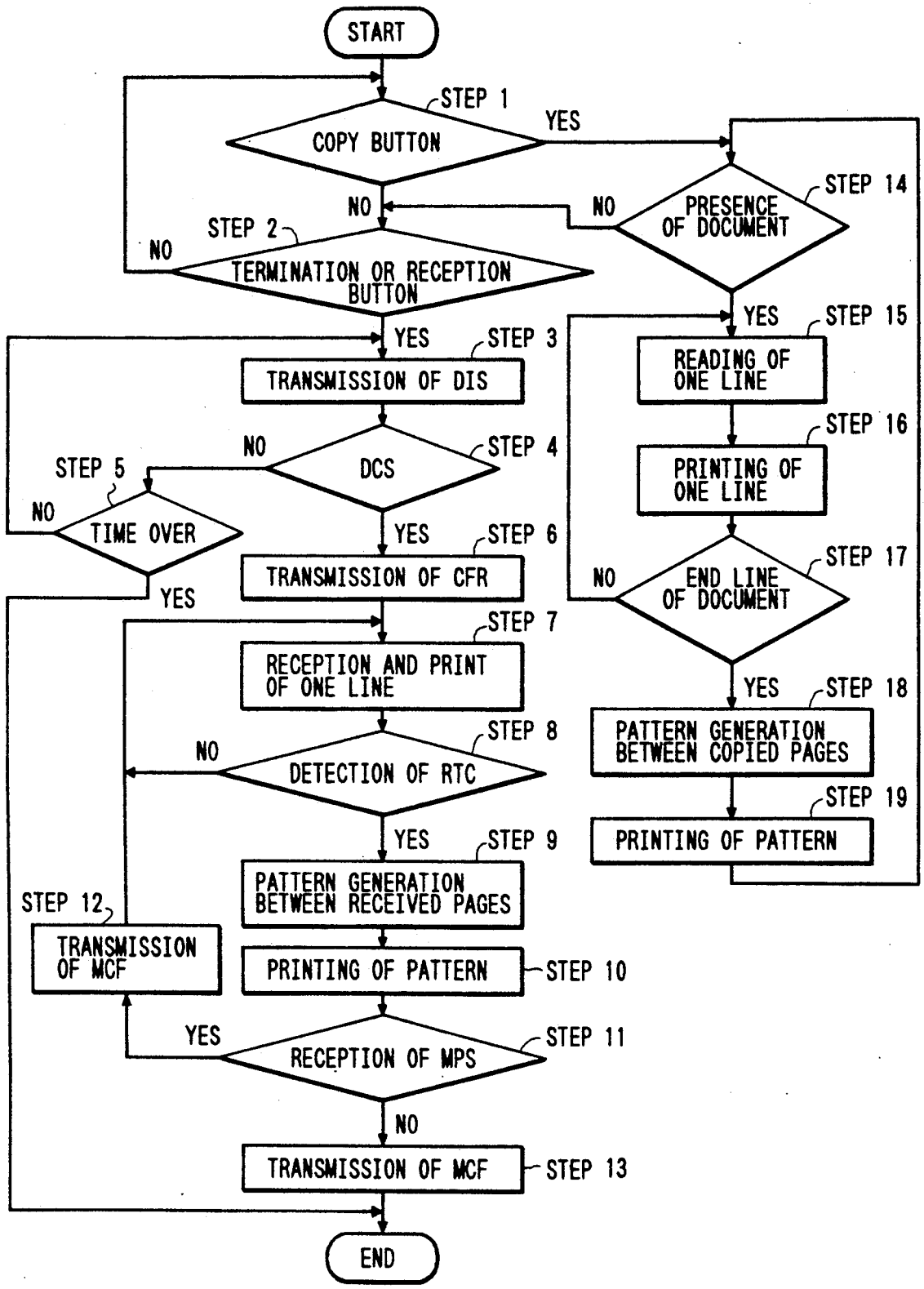
FIG. 1 is a flowchart for explaining an embodiment of the facsimile recording method according to the present invention.

FIG. 1 is a flowchart for explaining an embodiment of a recording method to print the end pattern explained above. When the power is turned ON, the operation flow starts. The steps from the step 1 to step 2 are looped as the waiting condition until a facsimile is terminated or copying is carried out. When a call is terminated or the reception button is depressed under the manual receiving condition, the operation proceeds to the step 3 to send a digital identification signal (DIS) to a calling terminal and then proceeds to the step 4 to wait for the digital command signal (DCS) as the corresponding response signal. However, for example, when the DCS is not received within 3 seconds, the steps to the step 3 from the step 5 are looped and DIS signal is transmitted again. If a response is not received from the calling terminal within a predetermined period, for example, after 35 seconds of the repeated transmission of the DIS, then the time becomes over in the step 5. Thereby, a disconnection command (DCN) signal is transmitted, turning off the line and ending the operation flow.

When the DCS is received from the calling terminal in the step 4, a receiving preparation confirming (CFR) signal is transmitted in the step 6 and an image signal of a single line is received and printed in the step 7. The steps to the step 7 from the step 8 are looped to receive and print the line by line until a control recovery (RTC) signal is received. Upon reception of an RTC, operation proceeds to the step 9, and an end pattern between the receiving pages is generated as explained previously and printing is carried out in step 10. Thereafter, operation proceeds to step 11 and whether there is a next page or not is detected by the presence of a multipage signal (MPS). When an MPS is received, a message confirming (MCF) signal is transmitted in step 12, and it is then looped to step 7 to receive the next page signal. Such operations are repeated.

In step 11, if an MPS is not received, it means the relevant page is the last page. In this case, the message confirming (MCF) signal is transmitted and a disconnection command (DCN) signal is transmitted, turning off the line and ending the operation flow.

In the case of copy mode, it is detected in the step 1 that the copy button is depressed and operation proceeds to step 14. If a document is set in the reading means operation proceeds to the step 15 for realizing copying operation. For the copying operation, a single line of a document is read in step 15, the single line is printed in step 16 and the step is looped to step 15 from step 17. These operations are repeated. At the ending line of the document, operation proceeds to step 18 from step 17, a pattern of copy mode which is different from the pattern generated in step 9 is generated, printing is carried out in step 19 and the step is looped to the step 14. If document to be copied is still left, operation proceeds to step 15 and the copying operation is carried out using similar procedures. If a document to be copied is no longer left, operation proceeds to step 2 from step 14, returning to the waiting condition.

Therefore, since the end patterns generated in step 9 and step 18 are different for the receiving mode and the copying mode, such patterns can be identified by observing the printed recording sheet and the received document is never confused with the copied document.

As will be obvious from the above explanation, this embodiment of the present invention results in the effect of providing the recording method in the facsimile apparatus using a rolled recording paper which simplifies arrangement of recording document and realizes accurate distribution because a received document and a copied document can easily be identified depending on the end pattern given between pages.

Figure 3:
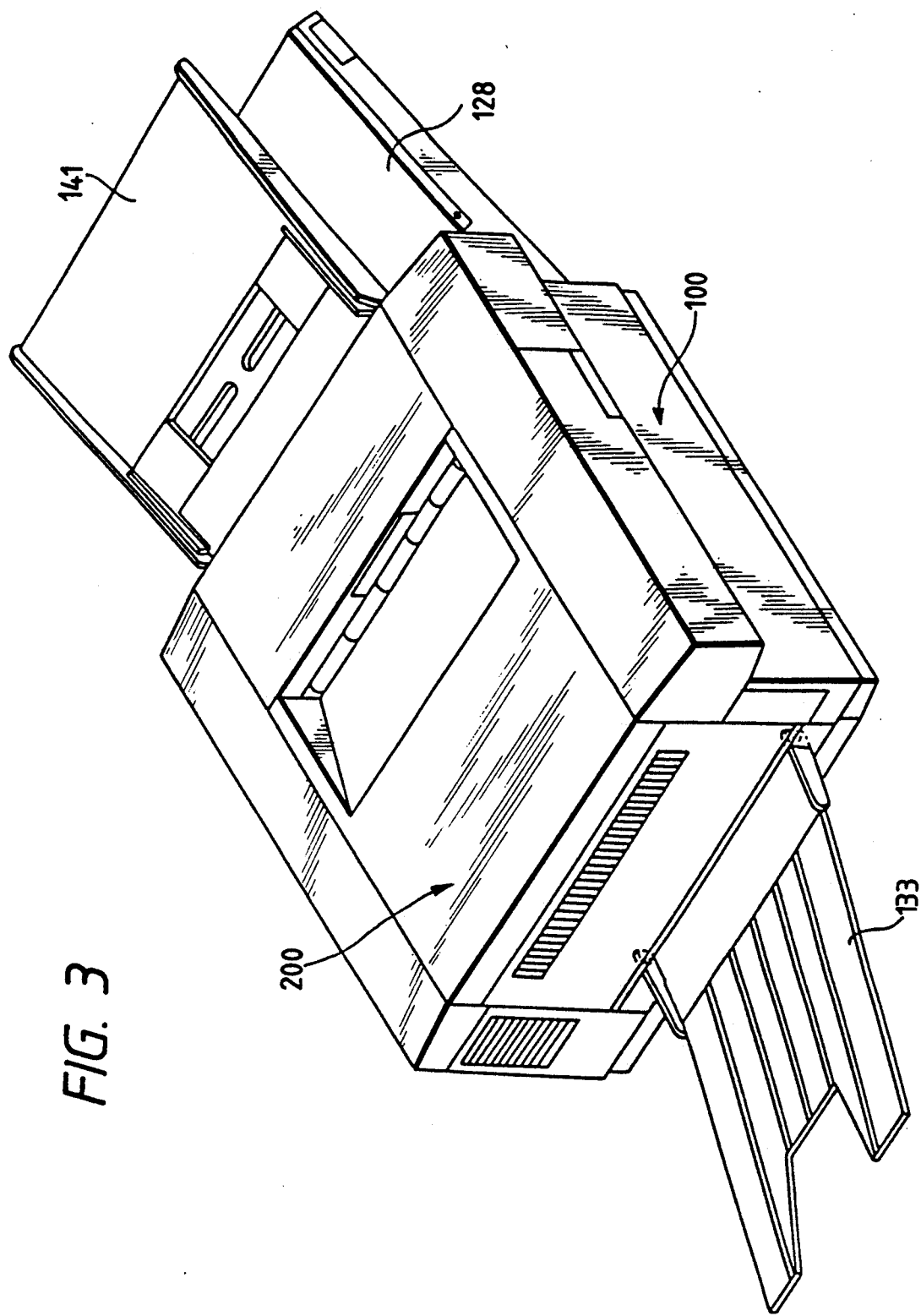
FIG. 3 is a perspective view of a facsimile apparatus as an embodiment according to the present invention.
Figure 4:
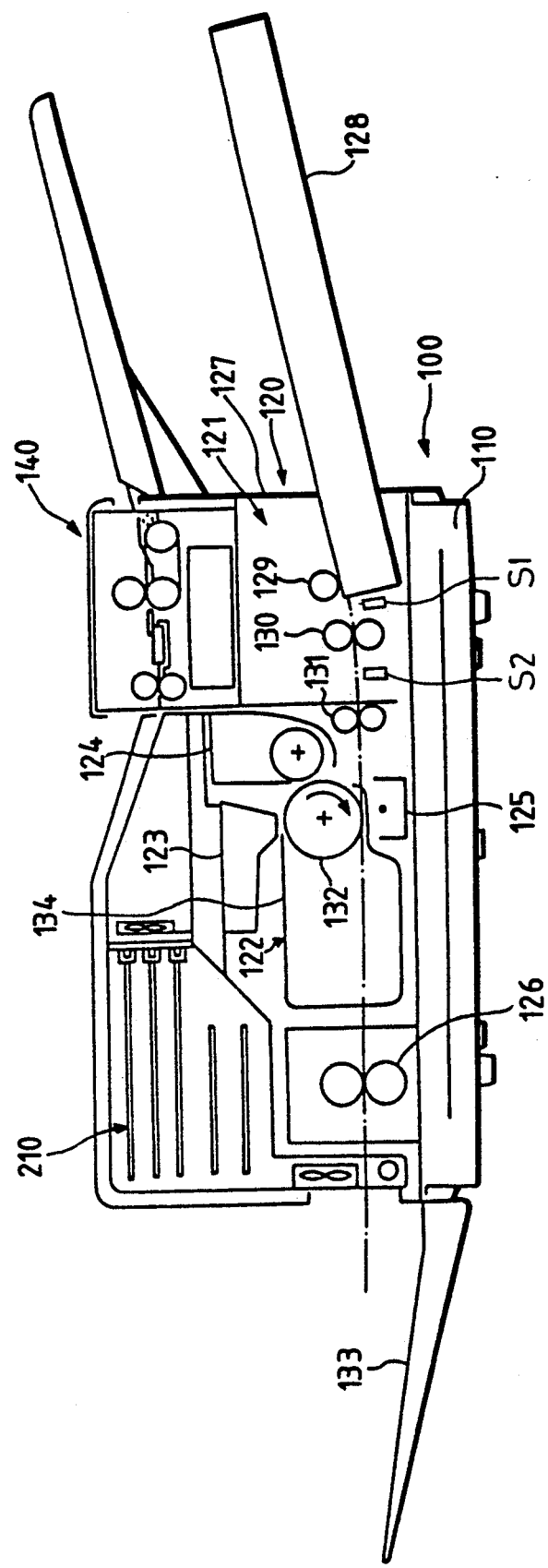
FIG. 4 is a sectional front elevation of FIG. 3.

Another embodiment of the present invention using ordinary paper which is previously cut in a determined size as the recording sheet will be explained hereunder by referring to FIG. 3 to FIG. 6. FIG. 3 is a perspective view of a facsimile apparatus to which the present invention may be applied and FIG. 4 is a sectional view of the front elevation.

The facsimile apparatus is formed by a fixed frame 100 and a movable frame 200 which may be opened or closed relative to such fixed frame 100 through a rotating operation. The fixed frame 100 is provided with a lower chassis 110, a printer 120 arranged thereon and a reading means 140 arranged on such printer 120. Meanwhile, the movable frame 200 is provided with a control means 210 for controlling the transmitting and receiving functions of the facsimile apparatus.

The printer 120 mentioned above is a so-called electrostatic type recording device comprising a cassette loading unit 121, a dram unit 122, an exposing unit 123, a developing unit 124, a transferring unit 125 and a fixing roller 126. These units are arranged in the predetermined sequence on the lower chassis 110.

The cassette loading unit 121 is provided with a hole, through which a cassette 128 is inserted or removed, at the side wall of a box-shaped casing 127. In the casing 127, a feed roller 129 for feeding the recording sheet from the cassette 128 being set through the hole and a separating roller 130 for preventing double transfer of recording sheet fed from such feed roller are provided.

The recording sheet separated by the separating roller 130 is transferred by the resist roller 131 synchronously with the rotation of a photosensitive drum 132. Here, a toner image is transferred onto the recording sheet from the photosensitive drum 132. The recording sheet is sent to the fixing roller 126 for thermally fixing the toner image and thereafter the recording sheet is ejected on the sheet ejection tray 133 provided at the left side of the facsimile apparatus.

The drum unit 122 has a structure integrally comprising the photosensitive drum 132, a cleaner 134 and a charger (not illustrated). Therefore, the charger, exposing unit, developing unit and cleaner are arranged around the photosensitive drum 132 in this sequence and thereby the printing by electrostatic recording system is carried out.

By the way, a sensor S1 is provided between the feed roller 129 and separating roller 130. This sensor S1 turns ON when the recording sheet is supplied from the cassette 128. Moreover, a sensor S2 is provided between the separating roller 130 and resist roller 131 and this sensor S2 turns ON when the copying sheet separated by the separating roller 130 is supplied in the print condition.

Figure 5:
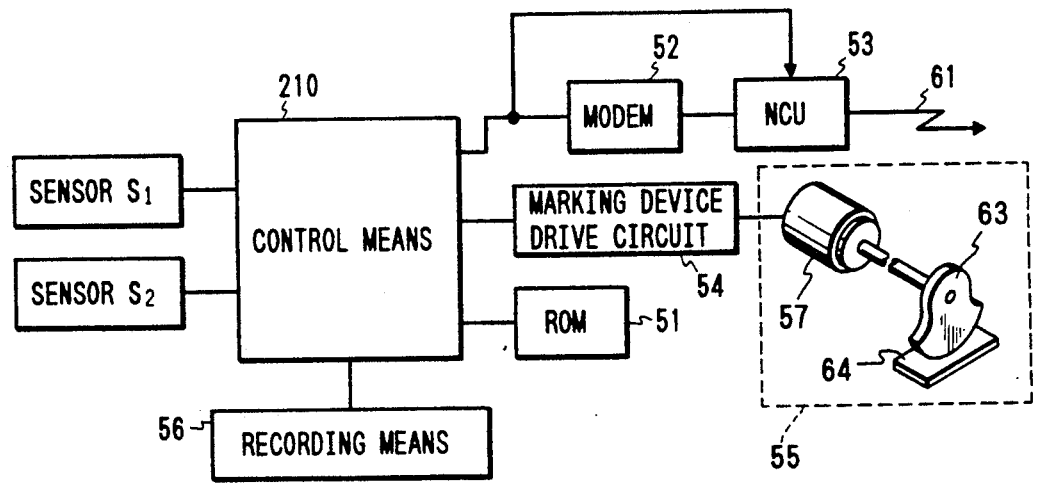
FIG. 5 is a block diagram indicating a schematic circuit structure of the facsimile apparatus.
Figure 6:
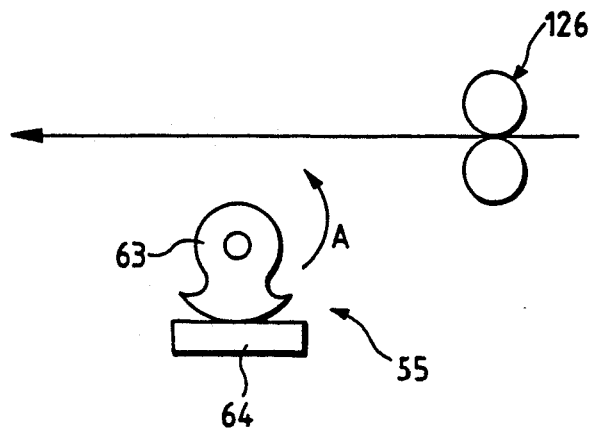
FIG. 6 is a side elevation of a marking device.

FIG. 5 is a block diagram indicating a schematic circuit structure of the facsimile apparatus. This facsimile apparatus is formed by the sensors S1, S2, ROM 51 for storing a program, recording means 56 consisting of drum unit 122 etc., control means 210 as the control center for controlling the entire part of the transmitting and receiving operations of the facsimile apparatus, modem 52, NCU 53, marking device drive circuit 54, and marking device 55. The marking device 55 is used for impressing the reception mark on the recording sheet and is provided, as shown in FIG. 6, in the down-stream side in the recording sheet transfer direction of the fixing roller 126. Moreover, the marking device 55 is formed by a stamp 63 having the engraved RECEIVED mark, a stamp board 64 for supplying the ink to the stamp 63 and a motor 57 (see FIG. 5) for driving the stamp. A number of rotations of motor is set so that the circumferential speed of stamp becomes equal to the transfer speed of the recording sheet.

Drive of stamp 63 is not limited to the drive by the motor provided additionally and it is also possible to drive the stamp by connecting it to the motor which drives the fixing roller 126 through a mechanism combining an electromagnetic clutch, one-way clutch and solenoid.

Here, the facsimile apparatus conducts the receiving operation as explained hereunder.

When the receiving information terminates from a calling party through the telephone line 61, NCU 53, modem 52, the control means 210 drives the recording means 56 to start recording of the receiving information. In practice, first the feed roller 129 rotates supplying a plurality of recording sheets from the cassette 128. The recording sheets are separated by the separating roller 130 and only a sheet of recording paper is supplied. Thereby, a recording sheet send signal is output to the control means 210 from a sensor S2. Next, a timer M1 included in the control means 210 starts the operation. Thereafter, the recording sheet is sent from a resist roller 131 which rotates synchronously with rotation of the photosensitive drum 132 for the developing process and the image is fixed by the fixing roller 126. Thereafter when the end part of recording sheet is transferred up to the upper part of the stamp 63, the stamp 63 rotates in the direction A due to the drive by the motor, the mark RECEIVED is printed on the recording sheet and thereafter the recording sheet is ejected on the sheet ejection tray 133.

Here, the drive by motor is started when the drive start command signal is output to the marking device drive circuit 54 from the control means 210 after the predetermined time (stored in ROM 1) has passed from start of the operation of timer M1. The practical content of predetermined time T is expressed by the following equation when the time required by the recording sheet to reach the resist roller 131 after passing the sensor S2 is considered as $t_1$, the waiting time of resist roller 131 as $t_2$, the recording sheet transfer time from the resist roller 131 to the marking device 55 as $t_3$ and the time required by the recording sheet to reach the marking position after passing the marking device 55 as $t_4$.

$$T = t_1 + t_2 + t_3 + t_4$$

It is desirable to provide the marking device 55 in the down-stream side of the recording sheet transfer direction of the fixing roller 126 in order to give the marking only on the received recording sheet but it is not limited only to this position.

Moreover, it would be better the color of marking is different from the color of printing in order to easily discriminating whether it is the recorded document sheet or copied document sheet.

In addition, the marking may be done to either side of the front and rear sides of the recording sheet but in case the marking is made on the front side, it is desirable that the color of marking should be that which cannot be copied by the copying machine in view of preventing quality deterioration of the copying operation.

In the preceding embodiment, the timing of marking is controlled electrically but the mechanical control in this embodiment is then explained.

Figure 7B:
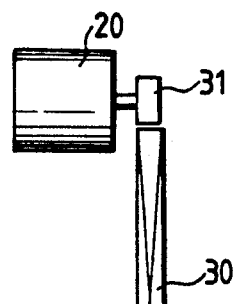
Figure 7A:
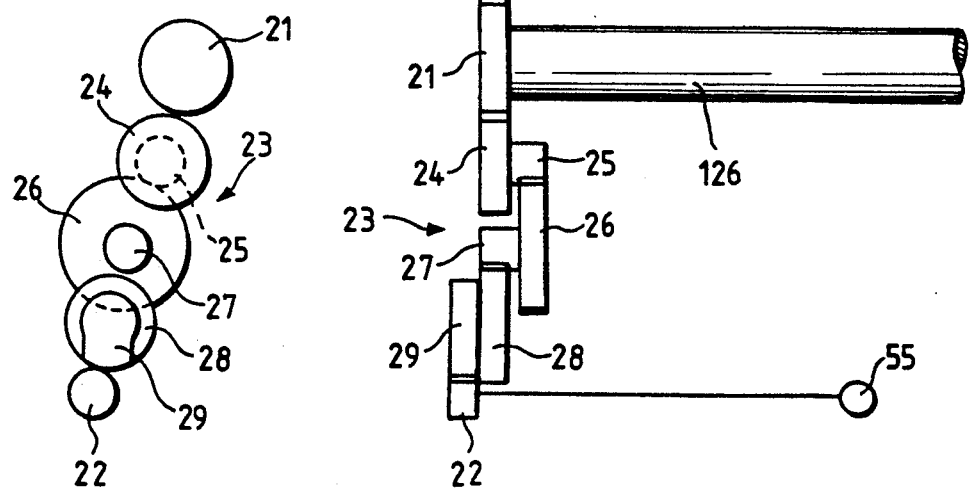

FIG. 7a and FIG. 7b show the driving system of the marking device. FIG. 7a is a side elevation, while FIG. 7b is a front elevation.

The marking device comprises a gear 21 of the fixing roller 126 to be driven by the motor 20 through the gear mechanisms 30, 31, a gear 22 for driving the stamp 63 and a reduction gear mechanism 23 for connecting both gears 21 and 22. This reduction gear mechanism 23 is provided to coinciding the circumferential speed of the marking device 55 with the paper feed speed. In more practical, it is formed by the gears 24~28 and an intermittent gear 29. This intermittent gear 29 makes a turn for a sheet of recording paper and is formed in the same number of teeth of the gear 22. Thereby, the stamp 63 gives a mark to a sheet of paper and is capable of giving the mark to the same position because the gear 22 waits for the paper at the same position for each ejection of the recording paper.

As explained above, this embodiment provides the effect that flexible operation of facsimile apparatus can be improved so far remarkably due to accurate discrimination for the received and copied document sheets.

What is claimed is:

1. A facsimile device having a facsimile reception mode and a copying mode, comprising:
   generating means for generating a first end pattern signal and a second end pattern signal,
   receiving means for receiving a facsimile signal,
   reading means for reading a document,
   recording means for printing a multipage document comprising a plurality of pages,
   selecting means for selecting at least one of the facsimile reception mode and the copying mode,
   means for printing the first end pattern on each page of the multipage document when the facsimile reception mode is selected, and
   means for printing the second end pattern on each page of the multipage document when the copying mode is selected.

2. The facsimile device of claim 1, wherein the device defines a recording sheet transfer path, and wherein the receiving means for receiving a facsimile signal comprises means for receiving facsimile image information, and further comprising:
   image generating means for printing on a recording sheet in the recording sheet transfer path an image corresponding to the received facsimile image information, and
   marking means provided in the recording sheet transfer path for marking the recording sheet with a mark indicating reception of the facsimile image information.

3. The device according to claim 2, wherein the marking means comprises:
   stamp means for stamping the recording sheet,
   drive means for driving the stamp means,
   sensor means for detecting the presence of the recording sheet in the transfer path and for generating a signal in response thereto, and
   control means in communication with the sensor means, for outputting a drive start command signal to the drive means upon the elapse of a predetermined time after receipt of the signal from the sensor means.

4. The device according to claim 2, wherein the marking means comprises:
   a fixing roller,
   drive means for driving the fixing roller,
   stamp means for stamping the recording sheet, and
   a reduction gear group for driving the stamp means.

* * * * *